United States Patent

Wang

Patent Number: 5,808,867
Date of Patent: Sep. 15, 1998

[54] POWER SUPPLY ASSEMBLY

[76] Inventor: Joseph Wang, No. 18-3, Lane 197, Fu Erh St., Keelung, Taiwan

[21] Appl. No.: 827,440

[22] Filed: Mar. 27, 1997

[51] Int. Cl.⁶ ....................................................... H05K 7/20
[52] U.S. Cl. ......................... 361/695; 361/683; 361/724; 361/725; 361/727; 439/64; 439/928.1
[58] Field of Search ..................................... 361/727, 735, 361/730, 694, 695, 608, 614, 639, 683, 724, 725; 174/252; 439/64, 928.1

[56] References Cited

U.S. PATENT DOCUMENTS 5,454,080  9/1995  Fasig et al. ............................. 361/685
5,563,767  10/1996  Chen ....................................... 361/685

*Primary Examiner*—Leo P. Picard
*Assistant Examiner*—Boris L. Chervinsky
*Attorney, Agent, or Firm*—Staas & Halsey

[57] ABSTRACT

A power supply assembly for use in a desktop computer is disclosed. The power supply assembly includes a frame consisting of a base plate, two side plates connected with the base plate and a connector sub-assembly attached to the base plate. Each of the side plates defines a tenon along its length. The connector sub-assembly includes a printed circuit board attached to the base plate, a power supply connector defining a first connecting side for connection with a power supply, a first golden finger contact and an expansion connector defining a second connecting side for connection with a second golden finger contact on another connector sub-assembly of another power supply assembly. A power supply has two side walls each defining a mortise fittingly engaging with a corresponding one of the tenons of the side plates of the frame and a third golden finger contact in connection with the first connecting side of the power supply connector. Two screws are brought to extend through the power supply to threadedly engage with the side plates of the frame to fixedly connect the power supply and the frame together.

7 Claims, 6 Drawing Sheets

1

POWER SUPPLY ASSEMBLY

FIELD OF THE INVENTION

The present invention is related to a power supply assembly, particularly to a power supply assembly for a desktop personal computer, wherein the power supply assembly can be very easily connected with or disconnected from another power supply assembly to change the level of output power of the power supply assembly.

1. Background of the Invention

To meet different requirements, the functions of desktop personal computers are getting more and more varied, which means that the personal computers need to be equipped with power supplies with different levels of output power (i.e. 300 Watts, 600 Watts or 900 Watts). To purchase and manage power supplies with different levels of output power is troublesome.

The present invention therefore is aimed to provide a power supply assembly to mitigate and/or obviate the aforementioned problems.

2. Summary of the Invention

An objective of the present invention is to provide a power supply assembly used for a desktop computer, wherein the power supply assembly can be very easily connected with or disconnected from another power supply assembly to change the level of output power of the power supply assembly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
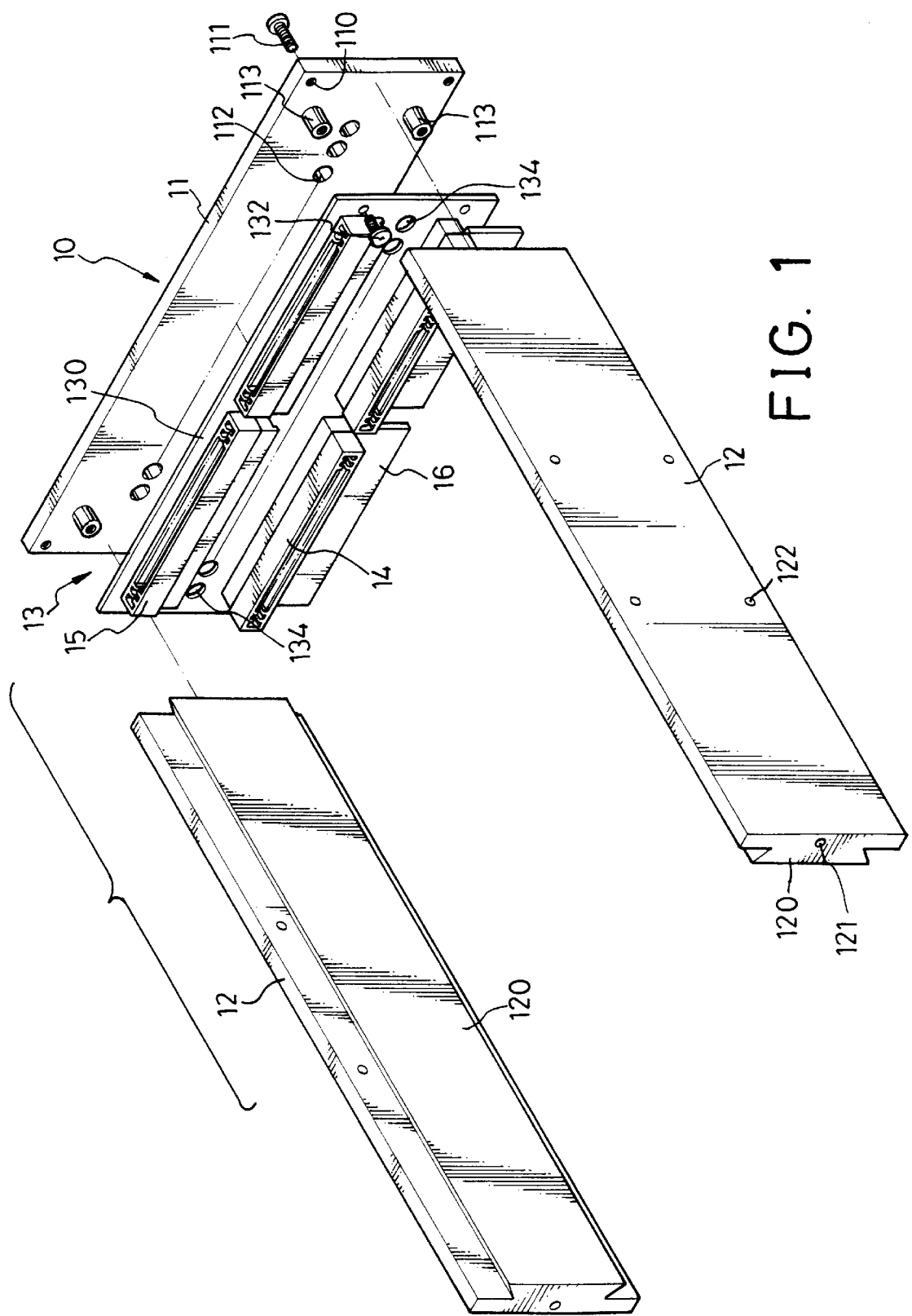
FIG. 1 is a front-right-top exploded, perspective view showing the constituting elements of a frame for mounting a power supply of a power supply assembly in accordance with the present invention.

Firstly referring to FIG. 1, a frame for mounting a power supply of a power supply assembly in accordance with the present invention is generally indicated by reference number 10. The frame 10 generally consists of a rear plate 11, two side walls 12 and a connector sub-assembly 13, wherein the rear plate 11 and the two side walls 12 generally form a U-like shape. The two side walls 12 are fixed to two sides of the rear plate 11 by extending four screws 111 (only one being shown) respectively through four holes 110 defined in four corners of the rear plate 11 to be threadedly received in four screw holes (not shown) defined in a rear end of the side walls 12. The connector sub-assembly 13 includes a printed circuit board 130 which is fixedly attached to the rear plate 11 by extending four screws 132 (only one being shown) respectively through four holes defined in four corners of the printed circuit board 130 to threadedly engage with four respective copper posts 113 fixedly attached to the rear plate 11. A first plurality of heat dissipating holes 112 are defined in a middle of the rear plate 11. A second plurality of heat dissipating holes 134 are defined in a middle of the printed circuit plate 130, wherein when the printed circuit board 130 is assembled with the rear plate 11, the first holes 112 and the second holes 134 are aligned with each other. A pair of expansion connectors 15 are mounted on an upper portion of the printed circuit board 130, wherein connecting sides of the expansion connectors 15 are faced upwardly. A pair of power supply connectors 14 are mounted on a lower portion of the printed circuit board 130, wherein connecting sides of the power supply connectors 14 are face forwardly. A pair of golden finger contacts 16 are electrically connected with and fixedly attached to the printed circuit board 130 and are extended downwardly from a location near the expansion connectors 14. Two tenons 120 are respectively formed on inner faces of the side walls 12. Two screw holes 121 are respectively defined in rear ends of the side walls 12. A plurality of screw holes 122 are respectively defined in outer surfaces of the sidewalls 12. The screw holes 122 are used for fastening the frame 10 to a housing of a desktop computer by screws. From FIG. 1, it can be clearly seen that the golden finger contacts 16 are extended in a direction orthogonal to the direction that the connection sides of the power supply connectors face and parallel to the printed circuit board 130. Furthermore, the connecting sides of the expansion connectors 15 face in a direction opposite to that of the extension of the golden finger contacts 16.

Figure 2:
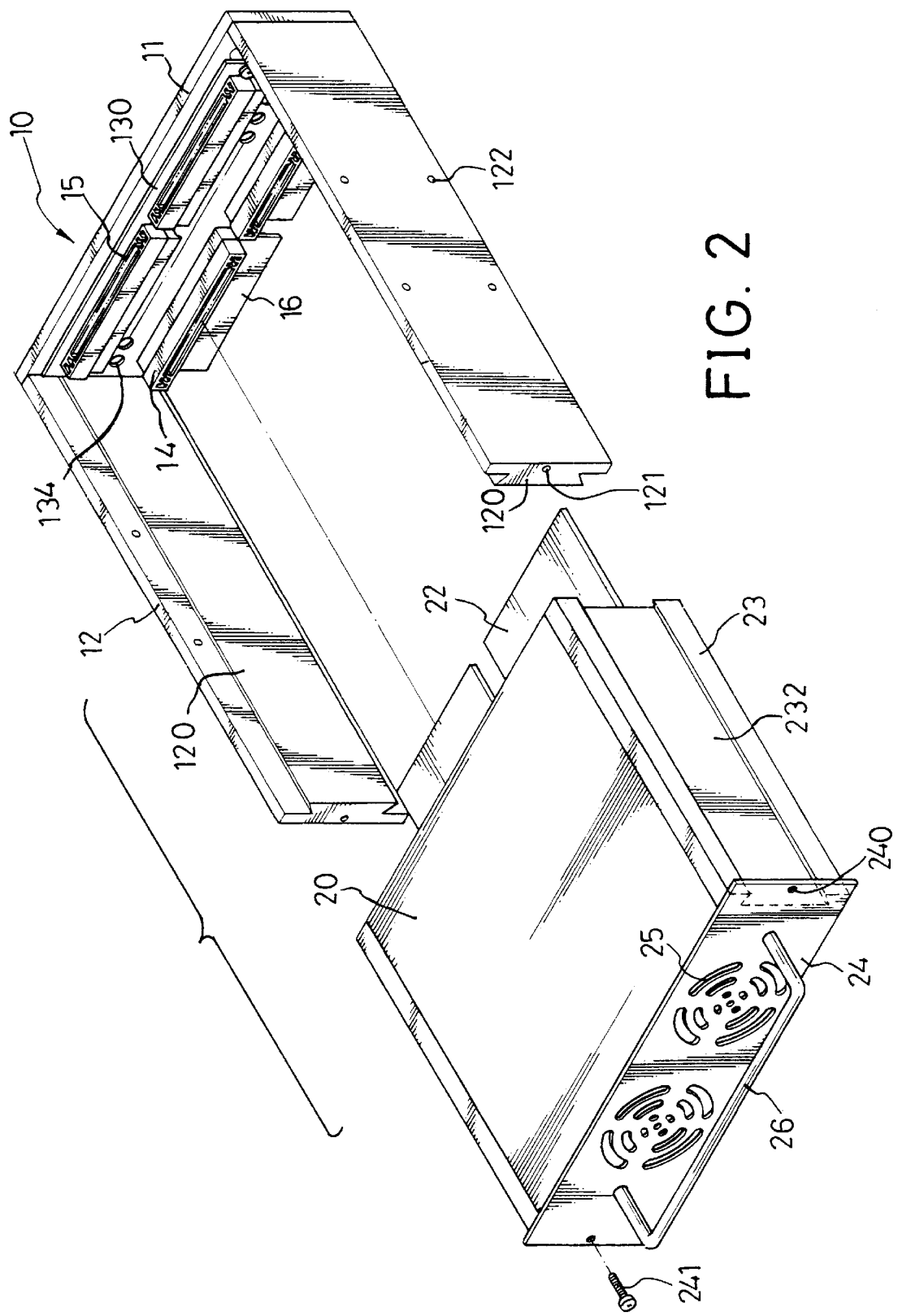
FIG. 2 is a view similar to FIG. 1, but showing that the elements thereof are assembled and a power supply is brought to be assembled with the frame.

Now please refer to FIG. 2, which shows that a power supply 20 is brought to be assembled with the frame 10. The power supply 20 has a housing including a front plate 24 and two lateral walls 23 each defining a mortise 232. The front plate 24 defines two groups of heat dissipating slots 25 in a middle portion thereof and two small holes 240 located at two lateral edges thereof. The two small holes 240 are used for two screws 241 to extend therethrough. A handle 26 is fixedly attached to the front plate 24. Two golden finger contacts 22 are electrically connected with and extended rearwardly from the power supply 20.

Figure 3:
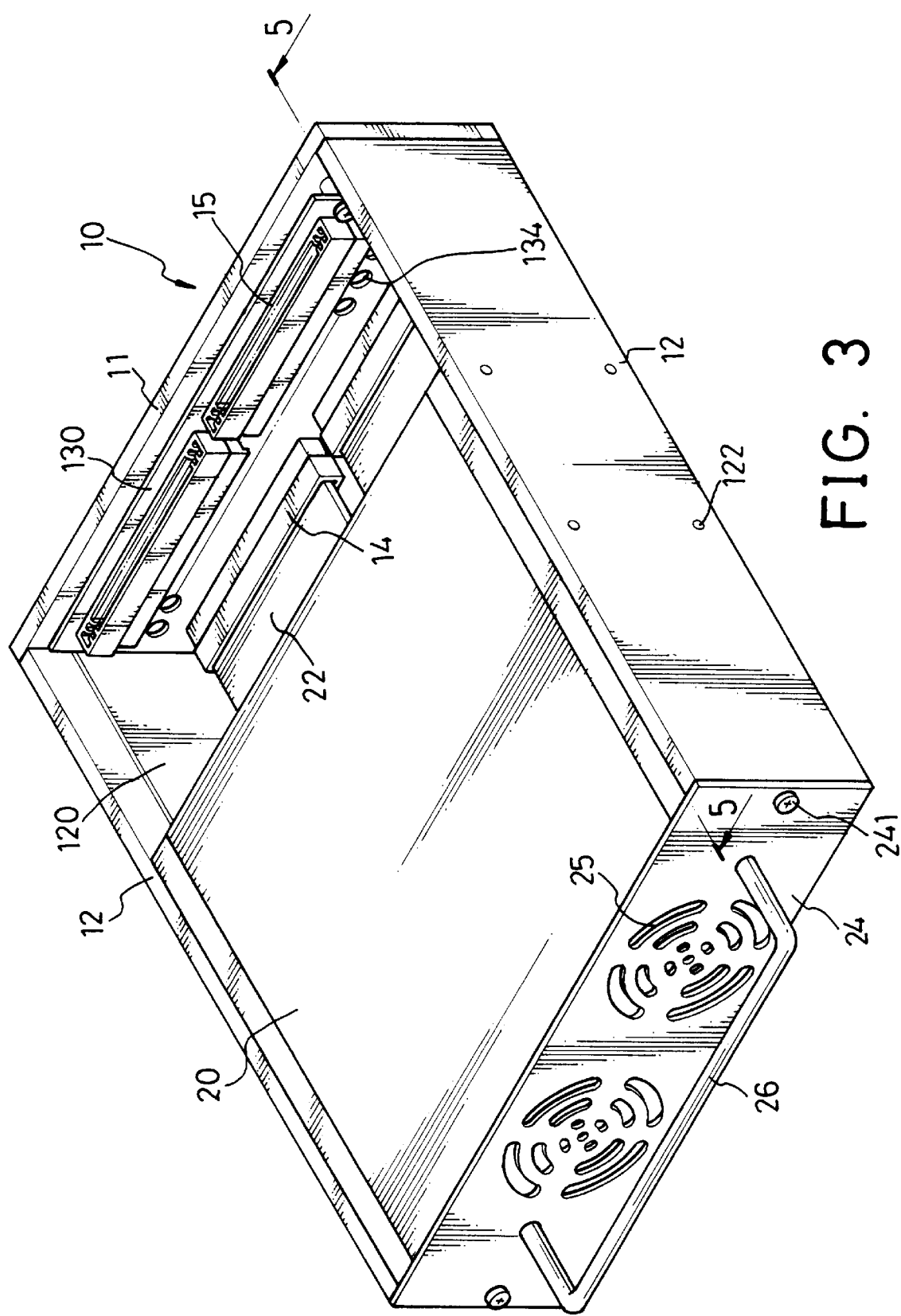
FIG. 3 is a front-right-top perspective view showing that the power supply and the frame are assembled to form a power supply assembly having a level of output power of a single power supply.

Now referring to FIG. 3, when the power supply 20 is brought to be mounted to the frame 10, firstly the side walls 23 of the power supply 20 are brought to engage with the side walls 12 of the frame 10 by fittingly extending the tenons 120 into the mortises 232 until the golden finger contacts 22 are inserted into and electrically connected with the power supply connectors 14. Then, the two screws 241 are brought to extend through the holes 240 to be threadedly received in the screw holes 121, whereby the power supply 20 is fixedly connected with the frame 10. The power supply 20 can have a specific level of output power, for example, 300 Watts, whereby the power supply assembly as show by FIG. 3, which has a single power supply can have an output of 300 Watts. In the assembled state, the heat dissipating slots 25 generally align with the heat dissipating holes 134 in the printed circuit board 130, which are in turn aligned with the heat dissipating holes 112 in the rear plate 11, so that when a fan in the power supply 20 is operated due to a computer in which the power supply assembly is incorporated is being operated, a flow of air can be generated to move through the power supply 20 to take heat generated by the electric components therein away.

Figure 4:
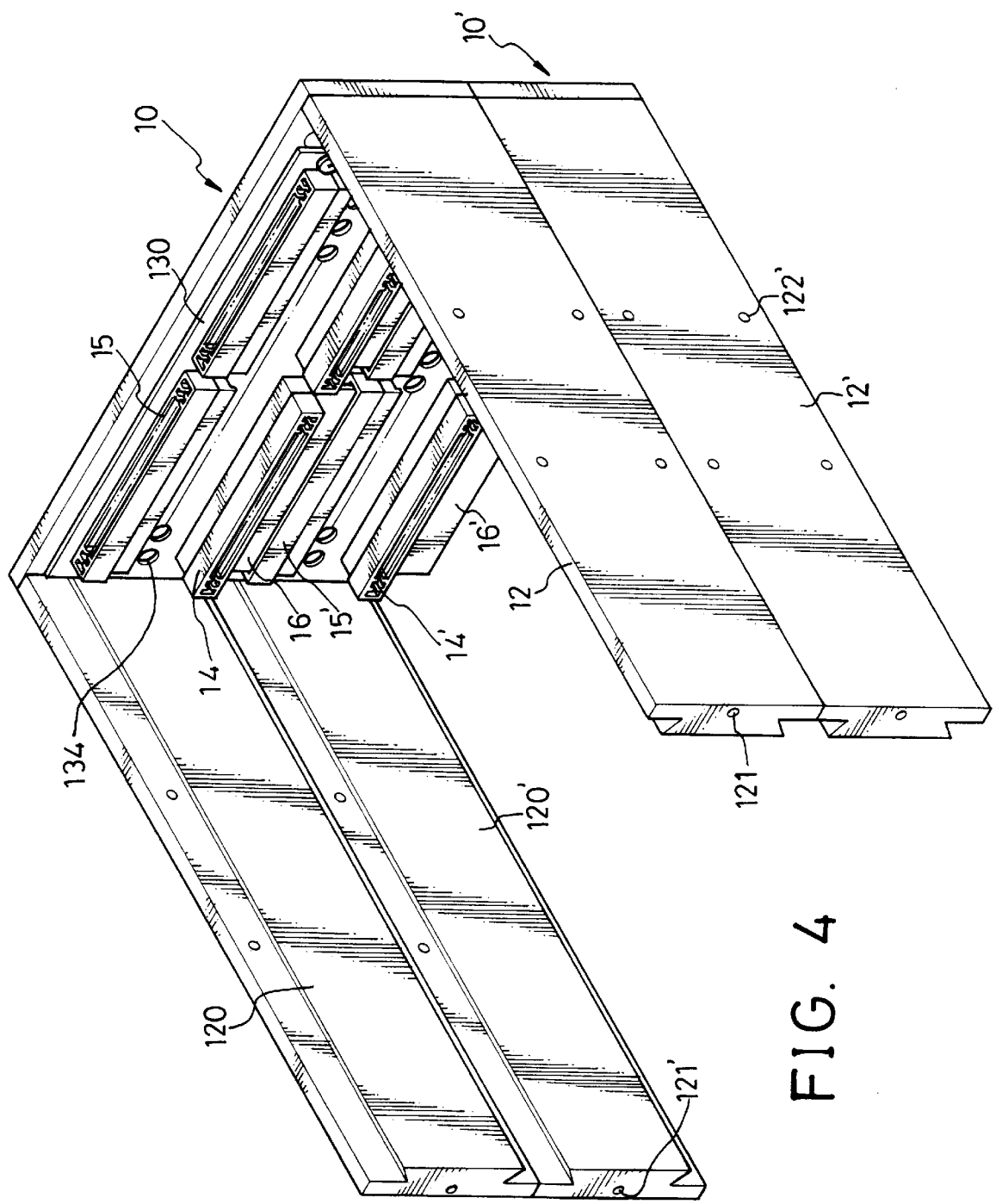
FIG. 4 is a front-right-top perspective view showing that two frames for mounting two power supplies of the power supply assembly are connected together.

FIG. 4 shows an upper frame 10 and a lower frame 10' are connected together by inserting the golden finger contacts 16 of the upper frame 10 into the expansion connectors 15' of the lower frame 10'.

Figure 5:
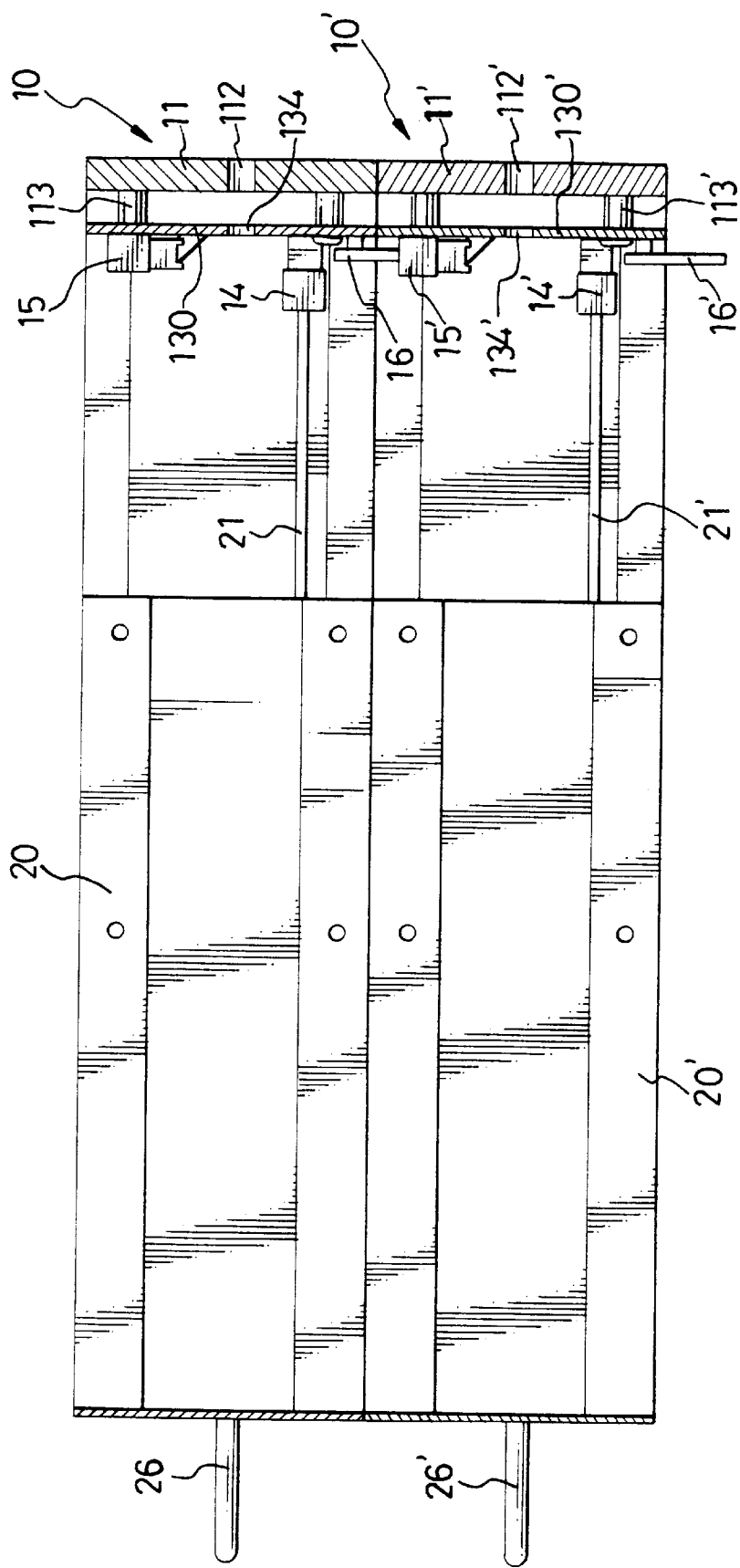
FIG. 5 is a right side, partially cut-away view showing that two power supplies are mounted onto the two frames of FIG. 4 to form a power supply assembly having a level of output power of two power supplies.

Then, as shown by FIG. 5, two power supplies 20 and 20' can be sequentially mounted into the frames 10 and 10' in a manner as disclosed by referring to FIG. 3 to obtain a power supply assembly having a level of output power of two power supplies so that the power supply assembly of FIG. 5 can have an output of 600 Watts.

Figure 6:
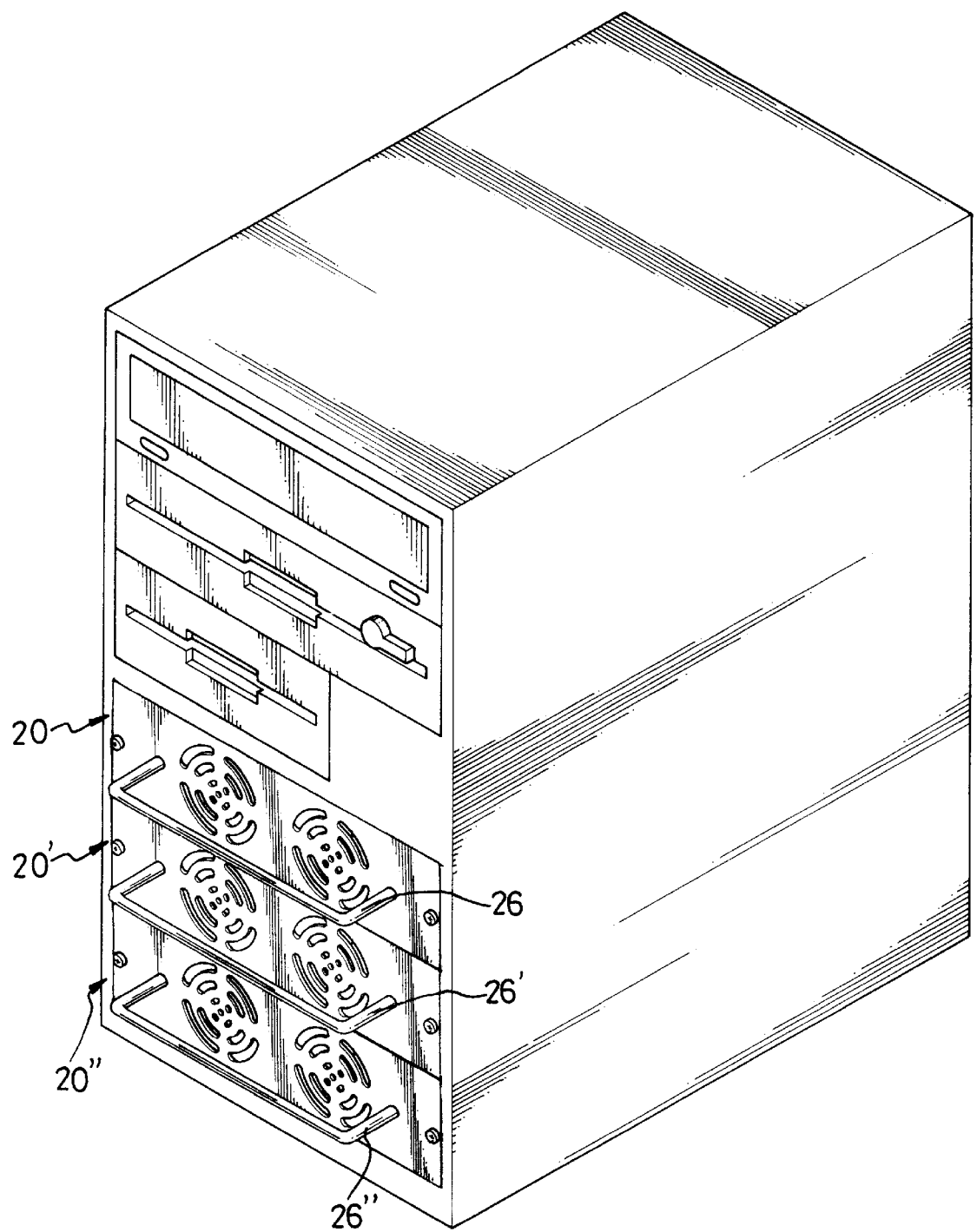
FIG. 6 is a front-right-top perspective view showing that a power supply assembly with three power supplies is mounted in a desktop personal computer.

FIG. 6 shows that a power supply assembly which is equipped with three power supplies 20, 20' and 20" is mounted in a desktop computer to afford a power of 900 Watts to the computer.

By the present invention, the power supply assembly can be very easily connected with or disconnected from another power supply assembly to change the level of output power of the power supply assembly. In other words, when a computer needs, for example, a power of 900 Watts to run it, the power supply assembly can be formed by connecting three power supplies respectively mounted in three frames together; alternatively, when a computer needs a power of 600 Watts to run it, the power supply assembly can be formed by connecting two power supplies respectively in two frames together; alternatively, when a computer needs only a power of 300 watts to run it, a power supply assembly with only a power supply mounted in a frame can be used. By the present invention, computer manufacturers only need to purchase one type of power supply assembly, and then combine the required number of power supply assembly together in accordance with the required power for running a specific computer. Thus, the present invention can overcome the trouble for computer manufacturers to purchase and manage different types of power supply assembly with different levels of output power.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A power supply assembly, comprising:
   a frame, comprising:
      a base plate and two side plates connected to two lateral ends of the base plate to form a U-like shape with the base plate, each said side plates defining a protrusion along its length;
      a connector sub-assembly attached to the base plate, wherein the connector sub-assembly includes a printed circuit board attached to the base plate, a power supply connector defining a first connecting side for connection with a power supply, a first golden finger contact and an expansion connector defining a second connecting side for connection to a golden finger contact on another connector sub-assembly of another power supply assembly; and
   a power supply having a housing defining two side walls each defining a groove fittingly engaging with a corresponding one of the protrusions of the side walls of the frame and a second golden finger contact in connection with the first connecting side of the power supply connector.

2. The power supply assembly in accordance with claim 1, wherein the first golden finger contact is extended in a direction orthogonal to the power supply connector and the second connecting side of the expansion connector faces a direction opposite to the extending direction of the first finger contact, and wherein the power supply connector is located below the expansion connector and the first golden finger contact is located below the power supply connector and the first golden contact is extended in a direction parallel to the printed circuit board.

3. The power supply assembly in accordance with claim 1, wherein the protrusions each have a shape of a tenon and the grooves each have a shape of a mortise.

4. The power supply assembly in accordance with claim 1, wherein the base plate and the printed circuit board are formed with heat dissipating holes aligning with each other, and wherein the power supply is provided with a front plate defining heat dissipating slots substantially in line with the heat dissipating holes of the base plate and the printed circuit board and a fan for generating a flow of air moved through the power supply to take heat generated by the electric components therein away.

5. The power supply assembly in accordance with claim 1, wherein the power supply is provided with a handle.

6. The power supply assembly in accordance with claim 4, wherein the power supply is provided with a handle attached to the front plate.

7. The power supply assembly in accordance with claim 1, wherein the power supply is connected with the side plates of the frame by extending screws through the power supply to threadedly engage with the side plates of the frame.

\* \* \* \* \*